ary, Agent, or Firm—J. Raymond Curtin; Robert P. Hayter

United States Patent [19]

Reedy et al.

[11] 4,227,721
[45] Oct. 14, 1980

[54] VARIABLE SIZE COUPLING

[75] Inventors: Wayne R. Reedy, Cazenovia; Edward F. Russ, Baldwinsville, both of N.Y.

[73] Assignee: Carrier Corporation, Syracuse, N.Y.

[21] Appl. No.: 949,464

[22] Filed: Oct. 10, 1978

[51] Int. Cl.² ............................................. F16L 35/00
[52] U.S. Cl. ....................................... 285/18; 279/1 B; 279/37; 285/96; 285/119; 285/177; 285/316; 285/320; 285/420; 285/DIG. 13; 285/DIG. 21
[58] Field of Search ................... 285/18, 35, 177, 315, 285/316, 320, 119, 96, 100, 101, 102, 420, DIG. 21, DIG. 13, DIG. 7; 279/1 B, 37, 106; 403/374

[56] References Cited

U.S. PATENT DOCUMENTS

| 792,626 | 6/1905 | Stephens | 285/320 X |
|---|---|---|---|
| 1,916,284 | 7/1933 | Ragan | 285/35 |
| 2,060,860 | 11/1936 | Flynt | 29/237 |
| 2,449,245 | 9/1948 | Nelson | 285/320 |
| 2,727,460 | 12/1955 | Russell | 285/DIG. 13 |
| 2,735,473 | 2/1956 | Diget et al. | 153/1 |
| 2,821,775 | 2/1958 | Pavelka | 29/237 |
| 3,071,188 | 1/1963 | Raulins | 285/DIG. 7 |
| 3,156,284 | 11/1964 | Stanley | 153/1 |
| 3,325,190 | 6/1967 | Elkert et al. | 285/18 |
| 3,426,417 | 2/1969 | Austin | 29/237 |
| 3,638,969 | 2/1972 | Serrano | 285/96 X |
| 3,691,604 | 9/1972 | Spontelli | 29/200 B |
| 3,773,169 | 11/1973 | Zahuranec | 206/46 H |
| 3,841,665 | 10/1974 | Capst | 285/DIG. 21 |
| 3,870,345 | 3/1975 | Liautaud | 285/315 X |
| 3,972,112 | 8/1976 | O'Silkey | 29/516 |

FOREIGN PATENT DOCUMENTS 261277  7/1960  Australia ..................... 285/DIG. 21

Primary Examiner—Dave W. Arola

[57] ABSTRACT

Apparatus for forming a tight seal between a coupling and a tube of variable sizes. A cylindrical housing defining an opening therein is provided such that a plurality of jaws having gripping teeth and gear teeth are mounted within the housing by being rotatably secured on a pin. A sleeve having rack teeth for engaging the gear teeth of the jaws is provided for rotating the jaws such that the inward extension of the gripping teeth may be varied. A piston having a seal mounted thereon and a projecting member extending therethrough is slidably maintained within the cylindrical opening such that a joint may be formed between the tube and the coupling. The piston defines together with the housing an expansible chamber which may be filled with a pressurized fluid to move the piston against the tube to assure a tight seal. A limit switch may additionally be provided such that if the gripping teeth do not properly engage the exterior of the tube the piston will be displaced sufficiently to engage the limit switch.

10 Claims, 3 Drawing Figures

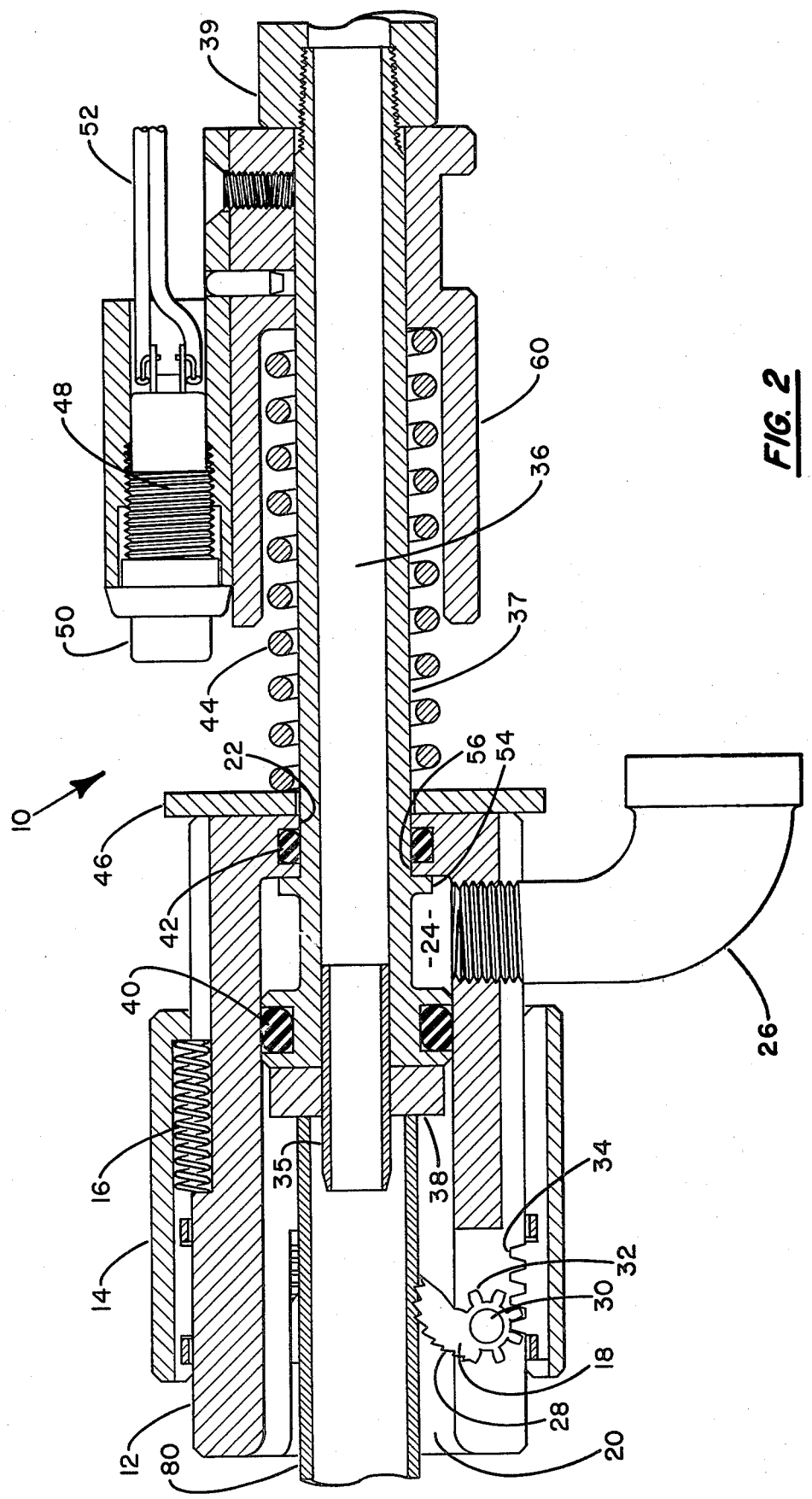

VARIABLE SIZE COUPLING

BACKGROUND OF THE INVENTION

1. Field of the Invention

The present invention relates to couplings adapted to be fitted to join two tubular members. More specifically the present invention concerns a coupling for securing various sized tubes to a conduit to form a tight seal therebetween.

2. Prior Art

Within the air conditioning and refrigeration industry it is desireable to test compressor assemblies salvaged from used air conditioning and refrigeration units to ascertain the condition of the compressor. Upon air conditioner malfunction and replacement the compressors from the units are forwarded to a rebuilding facility where on a large volume basis these compressors may be tested for several factors including whether or not they are electrically shorted, will meet pumping capacity and other operating characteristics.

When this compressor assembly is removed from a unit normally the tubing connections between the compressor and the rest of the air conditioning or refrigeration unit are mechanically severed. Additionally these compressors are of varying capacities such that the suction and discharge lines for these compressors also vary within a range of sizes. Consequently to enable a single coupling to be connected to these various size tubes leading from the compressor it is necessary that the coupling be adapted to form a tight seal with a range of tube sizes.

The variable size coupling described herein is specifically designed such that tubing having a range of internal and external diameters may be sealed in the coupling for testing and thereafter be removed. The coupling additionally has means to provide for a tight seal notwithstanding uneven mechanical deformation of the tubing when it is removed with the compressor from the unit.

SUMMARY OF THE INVENTION

It is an object of the present invention to provide a variable size coupling.

It is a further object of the present invention to secure various size tubes to a conduit to form a tight seal therebetween.

It is another object of the present invention to provide a coupling which is adapted to connect variable size tube to a conduit such that a pressure tight seal is formed for testing purposes.

It is a still further object of the present invention to provide a coupling which is easily adapted to secure a tube of varying diameter inserted therein subsequently to allow removal of the tube from the coupling.

It is another object of the present invention to provide a coupling having pressure means for forming a tight seal with variable size tubing and further having failsafe means such that if a tight joint is not formed the pressure testing device may not be operated.

It is a yet further object of the present invention to provide a reliable, safe, easy to manufacture and economical coupling for use in a compressor testing device for joining various size tubing from compressors to testing apparatus.

Other objects will be apparent from the description to follow and the appended claims.

The preceding objects are achieved according to the preferred embodiment of the invention by the provision of a housing defining a cylindrical opening therein. A plurality of jaws having gripping teeth and gear teeth are rotatably mounted within and spaced about the opening in the housing. The gripping teeth of the jaws are spaced at varying radial distances from the axis of rotation of the jaw such that depending upon the rotational position of the jaw the distance between the axis of rotation and the gripping teeth will be varied. The tube to be secured is inserted within the opening between the gripping teeth of the jaws.

A sleeve having rack teeth is slidably mounted about the housing such that the rack teeth of the sleeve engage the gear teeth of the jaws. A passageway extends thru a piston in slidable engagement with the interior of the opening in the housing, the piston having a seal mounted thereon. Hydraulic means are provided for supplying a pressurized fluid to an expansible chamber formed by the piston and the housing such that upon insertion of the tube against the seal, the tube is secured by the gripping teeth and the hydraulic means is used to force the piston having the seal thereon against the tube to form the tight joint. A limit switch having a contact button is mounted to the piston such that should the tube not be secured by the gripping teeth of the jaws the limit switch will be engaged when the piston has traveled the predetermined distance.

BRIEF DESCRIPTION OF THE DRAWINGS

FIG. 2 is a cross sectional view of the coupling in FIG. 1 with the tube.

DESCRIPTION OF THE PREFERRED EMBODIMENT

The embodiment as described herein concerns a variable size coupling for use with compressor testing apparatus to ascertain the condition of a compressor. It is to be understood that this coupling finds applicability to all types of couplings wherein a variable sized tube is joined to a conduit.

Figure 1:
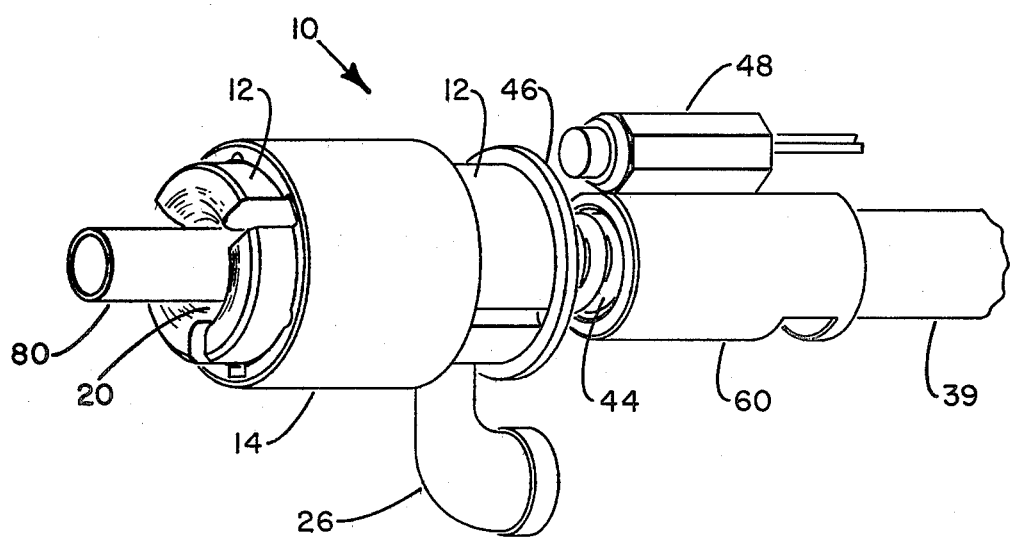
FIG. 1 is an isometric view of the claimed coupling having a tube secured therein.

Referring now to FIG. 1 it can be seen that coupling 10 has tube 80 inserted therein. Tube 80, which may be refrigerant line connected to a compressor, is a variable size tube from the compressor to be tested which is to be coupled with a conduit. Tube 80 is inserted within cylindrical opening 20 defined by housing 12. Sleeve 14 is slidably mounted on housing 12 interior the ends thereof. Hydraulic circuit 26 extends outwardly from housing 12 to provide pressurized fluid to the appropriate regions therein. Body 60 is mounted on a piston with spring 44 such that as the piston moves within housing 12 body 60 moves relative thereto. Limit swtich 48 is shown mounted on housing 60 such that it will contact washer 46 mounted to housing 12 upon sufficient displacement of the piston.

In FIG. 2, a cross sectional view of the coupling shown in FIG. 1, it can be seen that jaws 18 are mounted about the interior of first cylindrical opening 20 and have gripping teeth 28 extending inwardly therefrom. Jaws 18 are mounted for rotational movement on pin 30 and additionally have gear teeth 32 extending in one direction and gripping teeth 28 extending in the opposite direction. The gripping teeth are arranged such that they are radially offset from the axis of the rotation of the jaws. Consequently upon rotation of the jaw the inward extending distance of the furthest gripping tooth from the axis varies. It can be further seen in FIGS. 2 and 3 that three jaws are spaced about the interior of the first cylindrical opening 20.

Sleeve 14 is slidably mounted about housing 12. Rack teeth 34 are mounted on the interior edge of sleeve 14 in gear tooth engagement with gear teeth 32 such that a sliding movement of sleeve 14 produces a rotation of jaws 18. Spring 16 is provided to bias the sleeve relative to the housing to maintain the gripping teeth of the jaws extended inwardly.

Housing 12 defines both a first cylindrical opening 20 wherein the jaws are mounted and a second cylindrical opening 22 having piston 37 slidably mounted therein. Piston 37 has seal 38 mounted on the end thereof and passageway 36 extending longitudinally therethrough. Piston 37 and housing 12 define an expansible chamber 24 connected to the hydraulic circuit 26 such that upon the addition of hydraulic fluid to the expansible chamber the piston will move in reference to FIG. 2 from right to left.

O-rings 40 and 42 are provided between the piston and the housing to secure the hydraulic fluid within the expansible chamber. Piston abutment 54 is designed to contact housing abutment 56 when the piston is in the rightmost location. Spring 44 acting through washer 46 which abuts housing 12 biases piston 37 in the left to right direction in reference to FIG. 2. Passageway 36 extends through piston 37 outwardly from seal 38 within projecting member 35 such that the tube to be joined therewith is inserted over the end of projecting member 35. The projecting member forms part of passageway 36 between a compressor to be tested and the testing equipment. The end of projecting member 35 is tapered to guide the tube from the compressor to the appropriate location.

Piston 37 extends outwardly through the second cylindrical opening 22 and has mounted exterior of housing 12 body 60. Body 60 has a recess therein in which part of spring 44 is maintained. Mounted to body 60 are limit switch 48 having a limit switch button 50 and wires 52. Limit switch button 50 is located such that upon sufficient movement of the piston in a right to left direction the button will contact washer 46 and activate limit switch 48. The end of piston 37 is threaded such that conduit 39 connected to the compressor testing equipment may be secured thereto.

Figure 3:
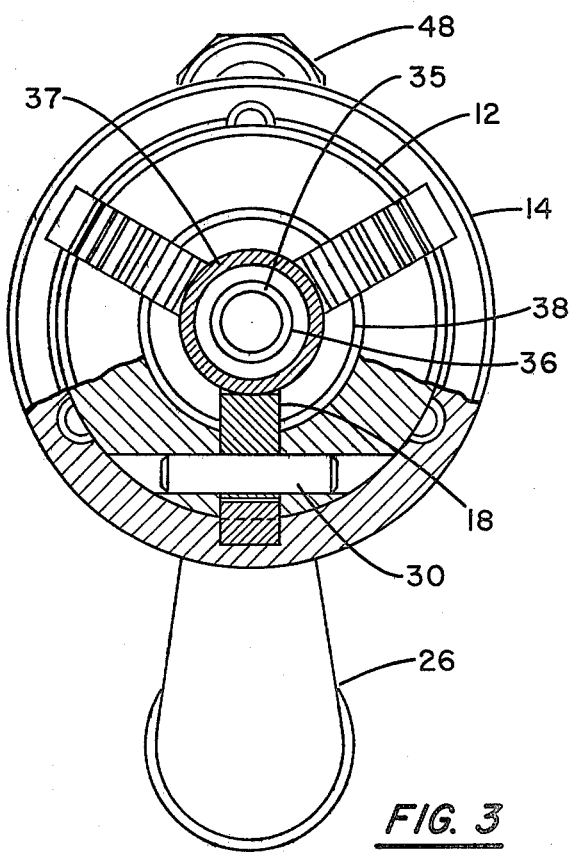
FIG. 3 is a sectional view of the coupling taken along line III—III in FIG. 2.

The relationship of jaws 18 in reference to each other may be seen in FIG. 3 which is an end view of the coupling. It can be seen therein that pins 30 are mounted to housing 12 and have jaws 18 mounted for rotation thereabout. Projecting member 35 is shown at the center thereof as is seal 38 adapted to receive the end of the tube to be connected thereto. Additionally hydraulic conduit 26 may be seen in FIG. 3.

Operation

The tube which is desired to be connected to the conduit herein for testing is inserted into the first cylindrical opening 20 until it engages seal 38. Prior to insertion of the tube the sleeve 14 is displaced from right to left such that the gripping teeth of the jaws are rotated outwardly providing a large diameter opening for the tube to be inserted therein. Once the tube abuts seal 38 such that the end of projecting member 35 is interior the end of the tube then sleeve 14 is moved from left to right such that the gripping teeth of the jaws are rotated inwardly to contact the exterior surface of the tube. Spring 16 acts to maintain the sleeve in position such that the gripping teeth are continually engaged with the tube. The gripping teeth are angled to prevent the tube from being disengaged from the seal.

Once the sleeve is released and the gripping teeth secure the tube then hydraulic or other pressurized fluid is supplied through hydraulic conduit 26 to expansible chamber 24. The pressurized fluid acts on piston 37 to move it from right to left such that the piston forces the seal against the tube end and the seal forces the tube into the gripping teeth. The gripping teeth should hold and a pressure tight seal is then formed between the seal and the tube end. The hydraulic circuit is arranged such that a predetermined pressure is developed against the tube end.

Should the gripping teeth fail to secure the tube as the piston is moved from right to left within first cylindrical opening 20 and second cylindrical opening 22 then the piston will continue to be displaced from right to left against the action of the spring 44 until such time that the limit switch button 50 of limit switch 48 contacts washer 46. Upon contact being initiated the limit switch button is depressed actuating the limit switch which discontinues coupling operation.

After the tube is secured and after the various compressor testing functions are completed the tube is removed by bleeding off the hydraulic pressue such that the spring 44 causes the piston to move from left to right back to its initial position as shown in FIG. 2. Thereafter sleeve 14 is slid from right to left disengaging gripping teeth 28 of jaws 18 such that the tube may be removed without further impediment. Sleeve 14 is then released and returns to its original starting position or another tube for testing may be inserted immediately therein.

This coupling has been designed for use with a compressor testing device such that various size tubes used as discharge and suction line tubes of a compressor may be connected to the compressor testing machine therewith. It is to be understood that this coupling has like applicability in other forms of connection devices.

The invention has been described herein with reference to a specific embodiment thereof. It is to be understood that modifications and variations can be made within the spirit and scope of the invention.

What is claimed is:

1. A coupling adapted for forming a tight seal with various sized tubes which comprises:
    a housing defining a cylindrical opening therein;
    a plurality of jaws having gripping teeth and gear teeth mounted for rotation about an axis;
    means for mounting the jaws to the housing such that the gripping teeth are located at varying radial distances from the axis of rotation and are within and spaced about the opening within the housing;
    having rack teeth thereon;
    means for mounting the rack means in sliding engagement with the exterior surface of the housing with the rack teeth mechanically engaging the gear teeth of the jaws such that a sliding motion of the rack means results in rotational motion of the jaws;
    means defining a fluid passage extending through the housing; and
    a seal associated with the fluid passage means and being adapted to abutably receive a tube to be secured in the coupling such that a fluid tight joint is formed between the tube and the fluid passage means, the rotatable jaws engaging the exterior surface of the tube to secure the tube to prevent removal from the coupling once the tube has been inserted therein.

2. The apparatus as set forth in claim 1 wherein the rack means is a sleeve mounted around the housing and having rack teeth extending therefrom, the sleeve being biased by a spring to maintain the jaws such that the gripping teeth are rotated inwardly and upon the displacement of the sleeve the jaws are rotated so that the gripping teeth are withdrawn toward the housing so that the tube may be inserted therebetween, the spring then biasing the sleeve upon its release so that the gripping teeth are rotated into mechanical engagement with the exterior surface of the tube.

3. The apparatus as set forth in claim 1 and further comprising:
 a piston mounted in the opening of the housing in sliding engagement with the housing, the piston having the seal mounted on one end thereof and the passage means extending therethrough, the piston together with the housing forming an expansible chamber; and
 pressure means for supplying a fluid under pressure to the expansible chamber to cause the piston to move relative to the housing, the pressure means being activated after the tube is inserted against the seal and after the jaws have rotated such that the gripping teeth engage the tube, the pressure means then forcing the piston against the seal, the seal against the tube and the tube against the gripping teeth of the jaws to form a fluid tight joint between the tube and the seal such that the passage means extending through the piston is in fluid flow communication with the interior of the tube.

4. The apparatus as set forth in claim 3 and further including:
 a body mounted to the piston but spaced from the housing;
 a limit switch mounted on the body for discontinuing the pressure means upon the switch being contacted;
 a spring mounted to bias the body away from the housing; and
 a contact surface mounted at the end of the housing adjacent the body such that as the piston is displaced within the housing the spring is compressed and the body may be displaced toward the housing until such time as the limit switch engages the contact surface discontinuing operation of the pressure means.

5. The apparatus as set forth in claim 1 wherein the passage means comprises a projecting member which extends beyond the seal and has an outside diameter less than the inside diameter of the tube which is to be joined to the coupling such that upon insertion of the tube into the coupling the end of the projecting member is located interior thereof.

6. A coupling for use with a compressor testing machine for forming a tight seal between a conduit extending from the testing machine and a tube extending from the compressor which comprises:
 a cylindrical housing defining therein a first cylindrical opening and a second cylindrical opening of lesser diameter;
 a plurality of rotatable jaws, each jaw having gripping teeth variably spaced from the axis of rotation thereof and each jaw additionally having gear teeth;
 means for securing the jaws to the housing such that the jaws may rotate about an axis;
 a sleeve having rack teeth mounted on the interior thereof for mechanical interaction with the gear teeth of the jaws;
 means for mounting the sleeve in sliding engagement with the exterior of the housing such that a sliding motion of the sleeve will cause the rack teeth to engage the gear teeth causing rotation of the jaws whereby the tube to be inserted into the coupling is engaged by the jaws and held in the coupling;
 a piston having a fluid passage means extending therethrough is slidably mounted within the first and second cylindrical openings of the housing abutting against the housing where the first cylindrical opening is reduced to the second cylindrical opening;
 sealing means operatively associated with the piston to abutably receive the tube to be inserted into the coupling;
 the housing and the piston forming an expansible chamber about the piston;
 the passage means extending through the piston which extends out of the housing through the second cylindrical opening; and
 pressure means for supplying a pressurized fluid to the chamber, said pressurized fluid displacing the piston in the housing to form a tight seal between the tube secured by the jaws and the seal mounted on the end of the piston such that a joint capable of withstanding high pressures is created between the tube and the passage means extending through the piston.

7. The apparatus as set forth in claim 6 and further including sealing means between the piston and the housing within the large diameter portion and sealing means between the piston and the housing with the small diameter opening.

8. The apparatus as set forth in claim 6 and further including:
 a body mounted to the piston but spaced from the housing;
 a limit switch mounted on the body;
 a spring mounted to bias the body away from the housing; and
 a contact surface mounted at the end of the housing adjacent the body such that as the piston is displaced within the housing the spring is compressed and the body is displaced toward the housing until such time as the limit switch engages the contact surface discontinuing operation of the pressure means.

9. The apparatus as set forth in claim 8 wherein the passage means comprises a projecting member which extends beyond the seal and has an outside diameter less than the inside diameter of the tube such that upon insertion of the tube into the coupling the tube is located with the end of the projecting member interior thereof.

10. The apparatus as set forth in claim 6 wherein there are three jaws spaced equally about the interior of the housing, each jaw having a series of gripping teeth with each successive tooth being located radially outward from the previous tooth and spaced therefrom such that rotation of each jaw provides gripping teeth at different radial distances from the axis of the rotation with the teeth being in the appropriate position for gripping the tube at that location.

* * * * *